US012411332B2

(12) United States Patent
Brazzle

(10) Patent No.: US 12,411,332 B2
(45) Date of Patent: Sep. 9, 2025

(54) NIGHT VISION GOGGLE RECORDING ADAPTER

(71) Applicant: Total Overwatch Productions, LLC, Broad Run, VA (US)

(72) Inventor: Arthur Brazzle, Broad Run, VA (US)

(73) Assignee: Total Overwatch Productions, LLC, Broad Run, VA (US)

( * ) Notice: Subject to any disclaimer, the term of this patent is extended or adjusted under 35 U.S.C. 154(b) by 56 days.

(21) Appl. No.: 18/495,318

(22) Filed: Oct. 26, 2023

(65) Prior Publication Data

US 2025/0138298 A1     May 1, 2025

(51) Int. Cl.
| | |
|---|---|
| *G02B 23/04* | (2006.01) |
| *G02B 1/04* | (2006.01) |
| *G02B 23/12* | (2006.01) |
| *G02B 23/16* | (2006.01) |
| *G03B 30/00* | (2021.01) |

(52) U.S. Cl.
CPC ............ *G02B 23/04* (2013.01); *G02B 1/041* (2013.01); *G02B 23/125* (2013.01); *G02B 23/16* (2013.01); *G03B 30/00* (2021.01)

(58) Field of Classification Search
CPC ...... G02B 23/04; G02B 1/041; G02B 23/125; G02B 23/16; G03B 30/00
See application file for complete search history.

(56) References Cited

U.S. PATENT DOCUMENTS

| | | | | |
|---|---|---|---|---|
| 4,463,252 | A | | 7/1984 | Brennan et al. |
| 4,961,626 | A | * | 10/1990 | Fournier, Jr. .......... G02B 13/16 |
| | | | | 345/9 |
| 5,506,727 | A | * | 4/1996 | Douglas ................. G02B 23/16 |
| | | | | 42/129 |
| 5,742,434 | A | * | 4/1998 | Carmeli ............... G02B 23/125 |
| | | | | 359/640 |
| 6,131,294 | A | * | 10/2000 | Jibiki ...................... G02B 23/14 |
| | | | | 359/353 |
| 8,860,831 | B1 | | 10/2014 | Burton et al. |

(Continued)

OTHER PUBLICATIONS

Brazzle, Arthur, Instagram post with no title, webpage https://www.instagram.com/p/BWN09M6grJd/, Jul. 6, 2017.

(Continued)

*Primary Examiner* — Balram T Parbadia

(74) *Attorney, Agent, or Firm* — Murphy, Bilak & Homiller, PLLC

(57) ABSTRACT

A night vision goggle recording adapter includes a hollow body configured to receive a distal end of a diopter housing of a night vision goggle and a beam splitter disposed in a first interior space delimited by the hollow body. The beam splitter is configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body. Additional features include but are not limited to a diameter of the first interior space being smaller than an outer diameter of the diopter lens assembly, an image recording device adapter mounted in a removeable manner to the hollow body, and a removeable eyecup.

20 Claims, 8 Drawing Sheets

(56) References Cited

U.S. PATENT DOCUMENTS

| | | | | |
|---|---|---|---|---|
| 2002/0071185 A1* | 6/2002 | Chretien | ............... | H04N 23/81 |
| | | | | 348/E5.078 |
| 2004/0091259 A1* | 5/2004 | Hanzawa | ............... | G03B 35/10 |
| | | | | 396/534 |
| 2008/0037110 A1* | 2/2008 | Gaber | ..................... | F41G 1/32 |
| | | | | 359/353 |
| 2009/0040600 A1* | 2/2009 | Vojtech | ................. | G02B 23/04 |
| | | | | 359/399 |
| 2009/0128934 A1* | 5/2009 | Plangger | ............... | G03B 17/48 |
| | | | | 359/811 |
| 2012/0030985 A1 | 2/2012 | Mauricio et al. | | |
| 2012/0098971 A1 | 4/2012 | Hansen et al. | | |
| 2019/0227296 A1* | 7/2019 | Davis | .................... | G03B 29/00 |

OTHER PUBLICATIONS

Brazzle, Arthur, "Total Overwatch Productions, a love story . . . ," webpage <https://totaloverwatchproductions.com/page/about/>, Feb. 28, 2023.

Amazon product listing, "Total Overwatch Productions NVGRA-14 NVG Recording Adapter for PVS-14 Diopter Lenses," webpage <https://www.amazon.com/Total-Overwatch-Productions-Recording-Adapter/dp/B073G8LMWV>, first available May 6, 2023.

"Adjustable NVG Mount (GoPro Style)", https://www.brainexplodermerch.com/product-page/adjustable-nvg-mount-gopro-style, Retrieved on Oct. 20, 2023.

"Because Operator Low Profile Mission Recorder (LPMR) MK II", https://tnvc.com/shop/because-operator-low-profile-mission-recorder-lpmr-mkii/, Retrieved on Oct. 20, 2023.

"NVG Adapter for GoPro Hero Cameras", Product Description, https://readymaderesources.com/product/nvg-adapter-for-gopro-hero-cameras/, Retrieved on Oct. 20, 2023.

* cited by examiner

NIGHT VISION GOGGLE RECORDING ADAPTER

BACKGROUND

Analog image intensifier tube technology enables users of night vision goggles (NVGs) to see in the dark. The analog nature does not lend toward recording, but digital NVG solutions do not match the sensitivity of analog NVGs. However, analog NVG images must be converted to digital for both recording and streaming of NVG images. Whether for training, promotion material, connecting NVG users digitally in real-time, etc., the demand for NVG recording solutions is growing. NVG recording solutions are constrained by metrics of space, weight, and power, as well as captured image quality, digital capabilities, and overall user experience. Thus, there is a need for an improved adapter for NVG recording.

SUMMARY

According to an embodiment of a night vision goggle recording adapter (NVGRA), the NVGRA comprises: a hollow body configured to receive a distal end of a diopter housing of a night vision goggle; and a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body, wherein a diameter of the first interior space is smaller than an outer diameter of the diopter lens assembly, such that a first wall of the hollow body that delimits the first interior space has an end face configured to abut a front face of the diopter lens assembly for all zero and positive diopter settings of the diopter lens assembly.

According to another embodiment of an NVGRA, the NVGRA comprises: a hollow body configured to receive a distal end of a diopter housing of a night vision goggle; a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and an image recording device adapter mounted in a removeable manner to the hollow body and aligned with the second port in the hollow body, wherein the image recording device adapter is configured to receive an image recording device and pass the beam reflected by the beam splitter through the second port to the image recording device.

According to another embodiment of an NVGRA, the NVGRA comprises: a hollow body configured to receive a distal end of a diopter housing of a night vision goggle; a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and a removeable eyecup slideably engaged onto the first wall of the hollow body that delimits the first interior space.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
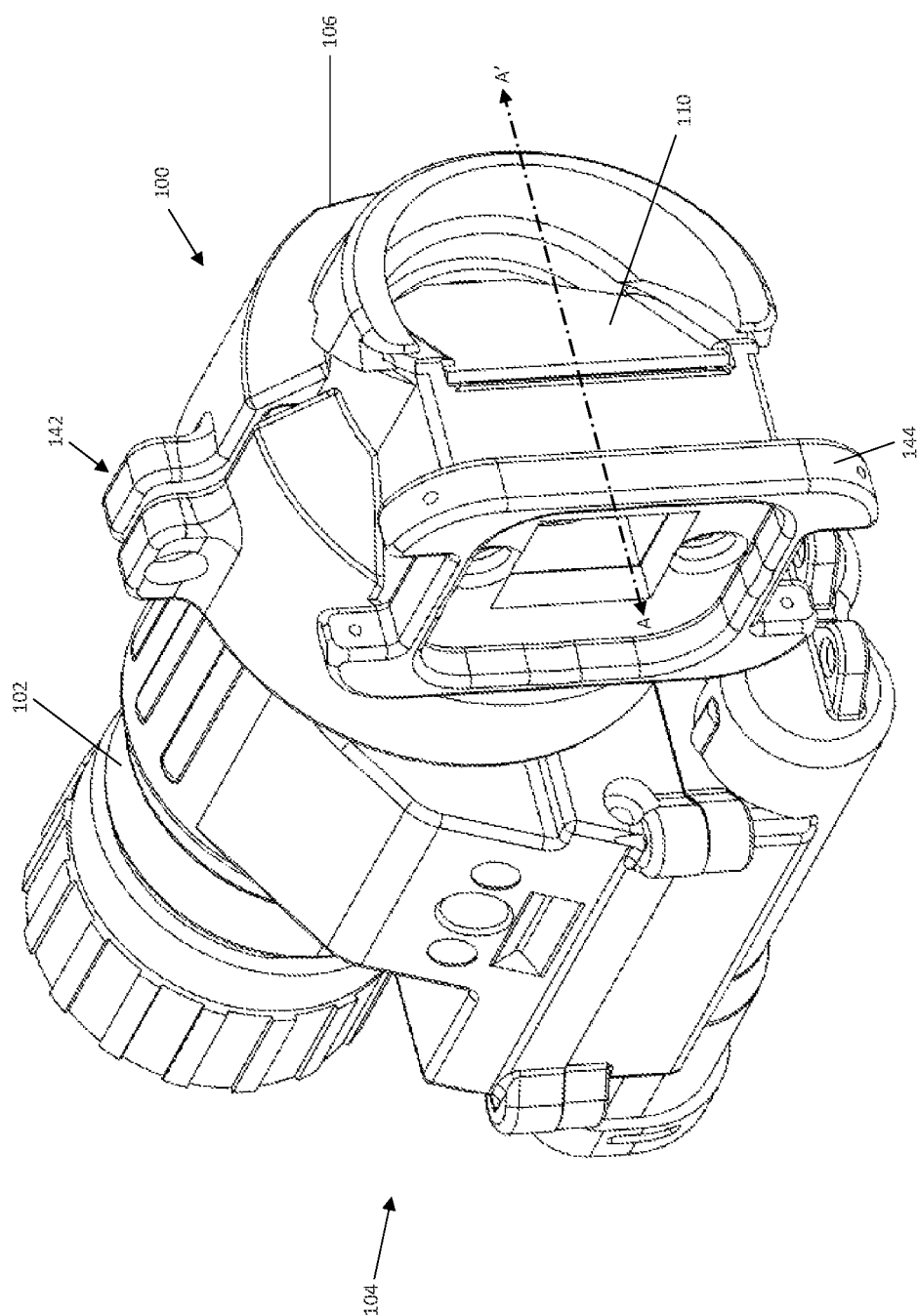
FIG. 1 illustrates a first side perspective view of a night vision goggle recording adapter (NVGRA) mounted to a diopter housing of a night vision goggles (NVG), according to an embodiment.

Described herein are embodiments of a night vision goggle recording adapter (NVGRA). The NVGRA includes a hollow body configured to receive a distal end of a diopter housing of a night vision goggle and a beam splitter disposed in a first interior space delimited by the hollow body. The beam splitter is configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body. The NVGRA captures the entire night vision goggle (NVG) tube image without obstructing the user's view. The NVGRA is positioned within the confined space between an NVG user's face, their eye protection, helmet, and the diopter lens of the NVG. The NVGRA provides a full NVG image to any action camera by reflecting a fraction of the light exiting the NVG tube with the beam splitter.

The NVGRA has various features which may be incorporated individually or in any combination, to address space, weight, and power constraints, and to improve captured image quality, digital capabilities, and overall user experience. Among these features are a diopter dip feature, a bent beam splitter feature, a removeable eyecup feature, and a removeable image recording device adapter feature.

The diopter dip feature provides for a first wall of the hollow body that delimits the first interior space having an end face configured to abut a front face of the diopter lens assembly for all zero and positive diopter settings of the diopter lens assembly. The tailored geometry that dips into the NVG diopter lens assembly allows for full image capture and reduces how far the recorder extends towards the operator's face.

The bent beam splitter feature provides for a first part of the beam splitter being angled with respect to the diopter lens assembly such that the beam of light that exits the diopter lens assembly toward the first part of the beam splitter has an angle of incidence less than 90 degrees. A second part of the beam splitter extends from the first part and is oriented at a different angle than the first part such that the first and second parts of the beam splitter collectively form a cover and the NVGRA is devoid of a separate cover lens at the viewing port. The bent beam splitter may be implemented using a polycarbonate material, for example.

The removeable eyecup feature enhances useability of the NVGRA. Spatially, the user's nose extends more toward the NVG diopter than does the outside of his or her face. The removeable eyecup feature exploits this to provide significant spatial footprint reductions. When installed on the NVGRA, the removeable eyecup feature reduces the amount of visible light that can pollute the recorded image. The beam splitter acts as a two-way mirror. In a dark room, only the NVG image is captured. When visible light is present, some image of the user's face will be present-generally outside of the NVG image projected onto the beam splitter. This may be more of an issue for training and promotional material than in an operational scenario, and thus the user can decide when to install the removeable eyecup.

The removeable image recording device adapter feature allows for accommodating various types of image recording devices. Rather than create a unique NVGRA body for each camera in existence, individual image recording device adapters can be installed on the NVGRA. This allows one NVGRA unit to be compatible with more than one type of image recording device, or family of image recording devices. Additionally, future image recording devices can be readily adapted simply by producing a new image recording device adapter. Still other features and benefits of the NVGRA are described herein.

Described next, with reference to the figures, are exemplary embodiments of the NVGRA.

Figure 2:
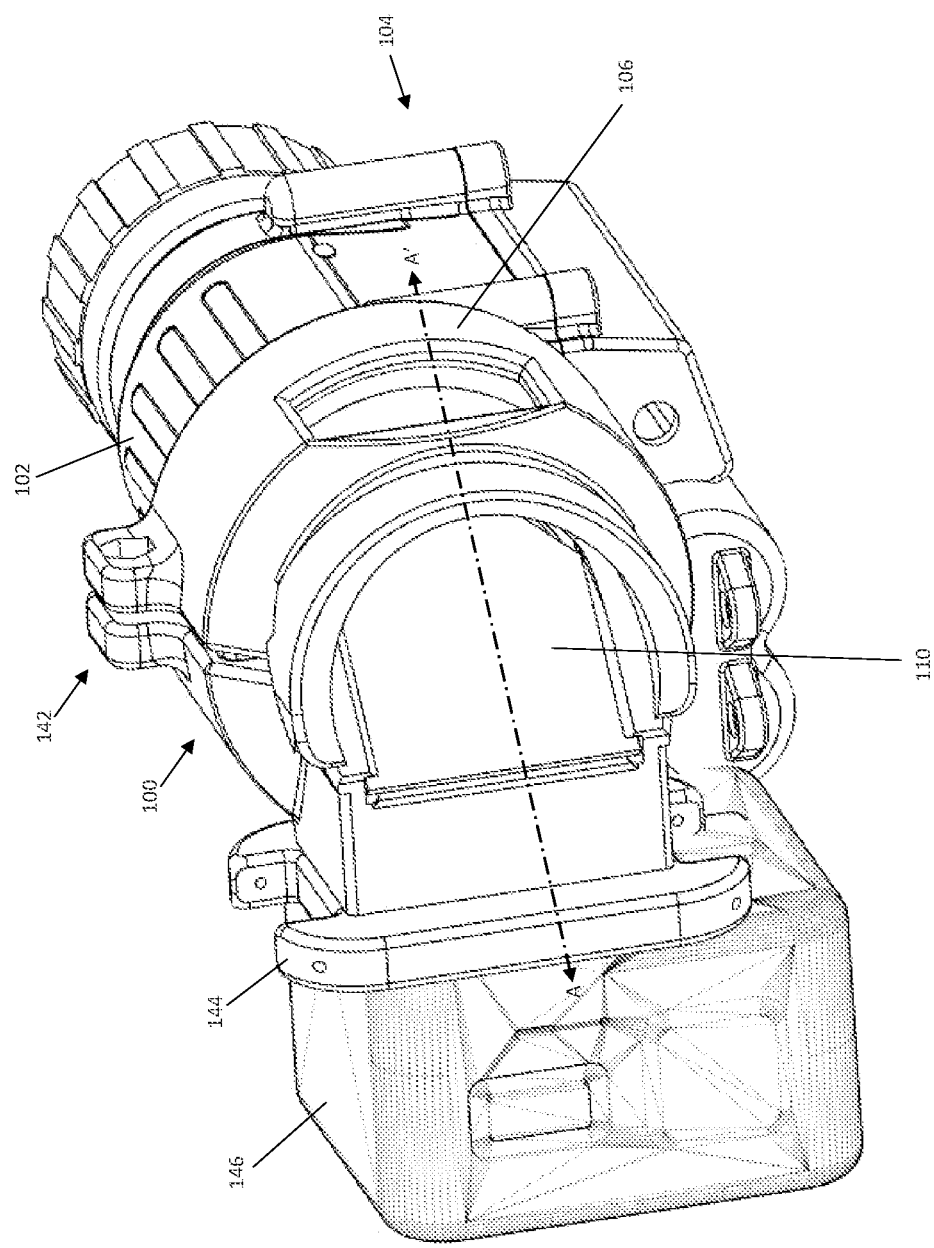
FIG. 2 illustrates a second side perspective view of the NVGRA mounted to the diopter housing of the NVG.
Figure 3:
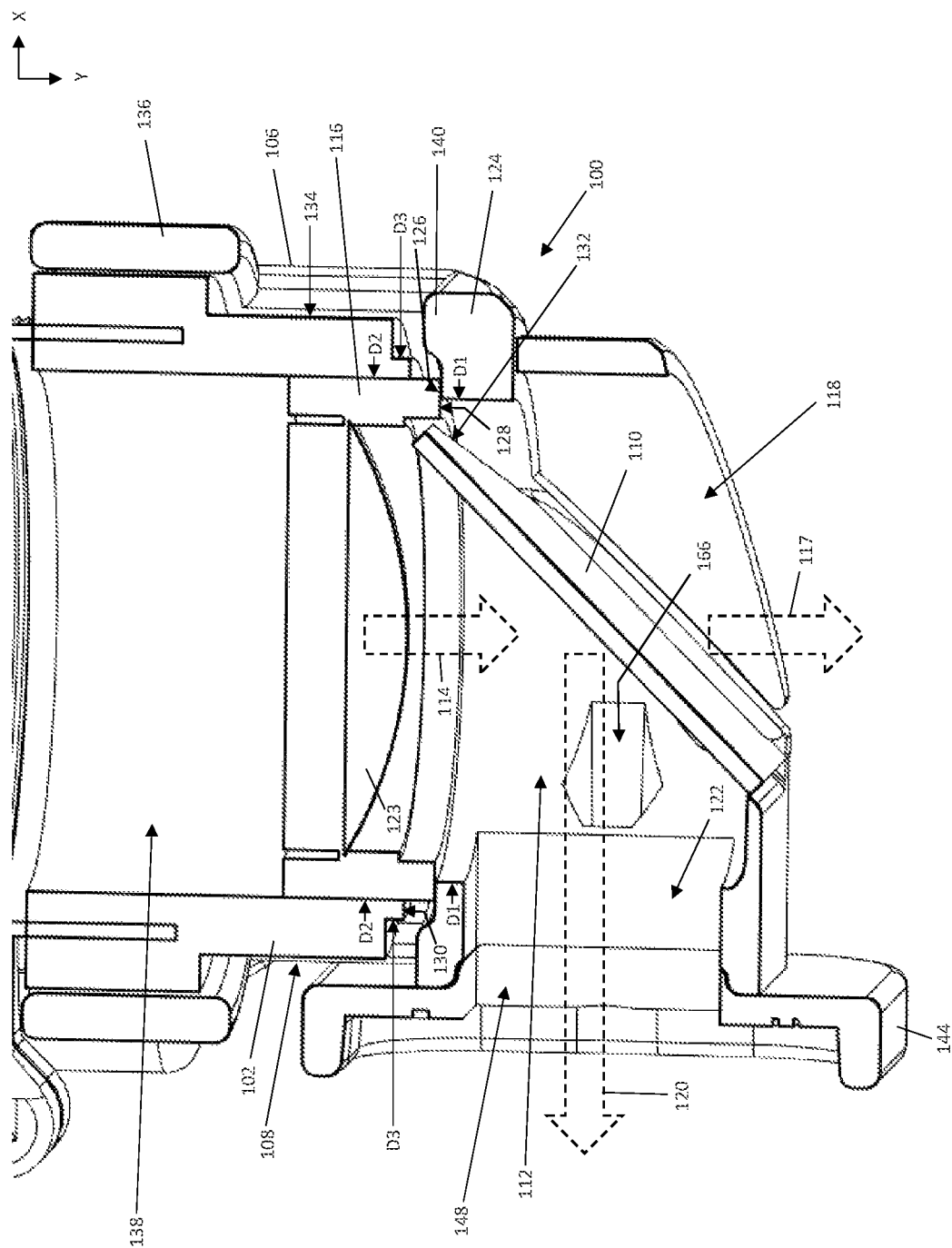
FIG. 3 illustrates a cross-sectional view of the NVGRA along the line labelled A-A' in FIGS. 1 and 2, in the horizontal X plane.

FIG. 1 illustrates a first side perspective view of the NVGRA 100 mounted to a diopter housing 102 of an NVG 104. FIG. 2 illustrates a second side perspective view of the NVGRA 100 mounted to the diopter housing 102 of the NVG 104. FIG. 3 illustrates a cross-sectional view of the NVGRA 100 along the line labelled A-A' in FIGS. 1 and 2, in the horizontal X plane. The term 'diopter' as used herein refers to the optical power of a lens or curved mirror and has a physical quantity equal to the reciprocal of the focal length, expressed in meters. For example, a 3-diopter lens brings parallel rays of light to focus at ⅓ of a meter.

The NVGRA 100 includes a hollow body 106 configured to receive a distal end 108 of the diopter housing 102 of the NVG 104. The hollow body 106 may be formed by injection molding, machining, 3-D printing, etc.

A beam splitter 110 is disposed in a first interior space 112 delimited by the hollow body 106 of the NVGRA 100. The beam splitter 110 is configured to split a beam of light 114 that exits a diopter lens assembly 116 disposed in the diopter housing 102 of the NVG 104 into a transmitted beam 117 that exits the NVGRA 100 through a first (viewing) port 118 in the hollow body 106 of the NVGRA 100 and a reflected beam 120 that exits the NVGRA 100 through a second (recording) port 122 in the hollow body 100. The diopter lens assembly 116 includes a lens 123 for focussing light captured by the diopter housing 102.

As shown in FIG. 3, a diameter D1 of the first interior space 112 of the hollow body 106 of the NVGRA 100 is smaller than an outer diameter D2 of the diopter lens assembly 116 of the NVG 104. According to this embodiment, a first wall 124 of the hollow body 106 that delimits the first interior space 112 has an end face 126 configured to abut a front face 128 of the diopter lens assembly 116 for all zero and positive diopter settings of the diopter lens assembly 116 relative to the front face 130 of the diopter housing 102, as opposed to a fixed justification such as +2 mm outside the diopter lens assembly 116. The diameter relationship of D1<D2 enables the diopter dip feature described above, and allows the user to select an optimal mounting position for the NVGRA 100 relative to the user's preferred diopter setting for the NVG 104 instead of a mounting position that is based on an arbitrary diopter setting not determined by the user (e.g., fixed at +2 diopters).

A zero diopter setting means that the front face 128 of the diopter lens assembly 116 is flush with the front face 130 of the diopter housing 102. Traversing the diopter lens assembly 116 outward from the zero setting correlates to a positive diopter adjustment. A positive diopter setting means that the front face 128 of the diopter lens assembly 116 is extended outward beyond the front face 130 of the diopter housing 102. A negative diopter setting means that the front face 128 of the diopter lens assembly 116 is recessed inward from the front face 130 of the diopter housing 102.

The diopter dip feature can account for diopter adjustments from −1 to +4 or even more positive, e.g., +6 diopters. This translates to space savings between the NVGRA 100 and the user's face, as the beam splitter 110 still captures the image regardless of diopter adjustment while also retaining maximal image alignment while traversing with the diopter housing 102.

Many NVGs have an adjustable diopter setting, e.g., in a range of −6 to +6 diopters, which represents approximately 5 mm travel in the Y axis in FIG. 3. As shown in FIG. 3, the beam splitter geometry may enable the beam splitter 110 to extend into the diopter lens assembly 116 when the first wall 124 of the hollow body 106 that delimits the first interior space 112 of the NVGRA 100 abuts the front face 128 of the diopter lens assembly 116. This allows the beam splitter 110 to be positioned some distance inside of the diopter lens assembly 116 in the Y axis.

To reduce interference with the diopter housing 102, the outer edge 132 of the beam splitter 110 that faces toward the diopter lens assembly 116 may be bevelled, allowing a more precise fitment while retaining enough of the beam splitter 110 to capture the inner edge of the NVG image 114. If the diameter D1 of the first interior space 112 of the hollow body 106 of the NVGRA 100 is smaller than the outer diameter D2 of the diopter lens assembly 116 of the NVG 104, the beam splitter 110 is justified at least through the full range of zero and all positive diopter settings by riding the body of the diopter lens assembly 116 rather than the outer face 134 of the diopter housing 102 and enabling full traversal for adjustable diopter assemblies.

As shown in FIG. 3, the hollow body 106 of the NVGRA 100 may also have a second wall 136 that delimits a second interior space 138 configured to receive the distal end 108 of the diopter housing 102. The first interior space 112 of the hollow body 106 of the NVGRA 100 is openly connected to the second interior space 138. The first wall 124 and the second wall 136 of the hollow body 106 of the NVGRA 100 are connected to one another by a transition region 140 of the hollow body 106 that accommodates an outer diameter difference (D3-D2) between the diopter housing 102 and the diopter lens assembly 116 of the NVG 104. As shown in FIGS. 1 and 2, the NVGRA 100 may include a clamp or similar type of fixing structure 142 for holding the NVGRA 100 in place when mounted to the diopter housing 102 of the NVG 104.

FIG. 3 also illustrates the removeable image recording device adapter feature described above. In FIG. 3, the NVGRA 100 may also include an image recording device adapter 144 mounted in a removeable manner to the hollow body 106 of the NVGRA 100 and aligned with the second (recording) port 122 in the hollow body 106. The image recording device adapter 144 and the hollow body 106 are separate parts in this embodiment. The image recording device adapter 144 is configured to receive an image recording device 146 such as an action camera and pass the beam 120 reflected by the beam splitter 110 through the second (recording) port 122 of the NVGRA 100 to the image recording device 146 via a corresponding port 148 in the image recording device adapter 144.

FIG. 2 shows an image recording device 146 mounted to the image recording device adapter 144 of the NVGRA 100. The image recording device 146 may be secured to the image recording device adapter 144 by a vinyl strap (not shown) that provides a gripping surface and positive retention, for example. The image recording device adapter 144 may be formed by injection molding, machining, 3-D printing, etc.

Figure 4:
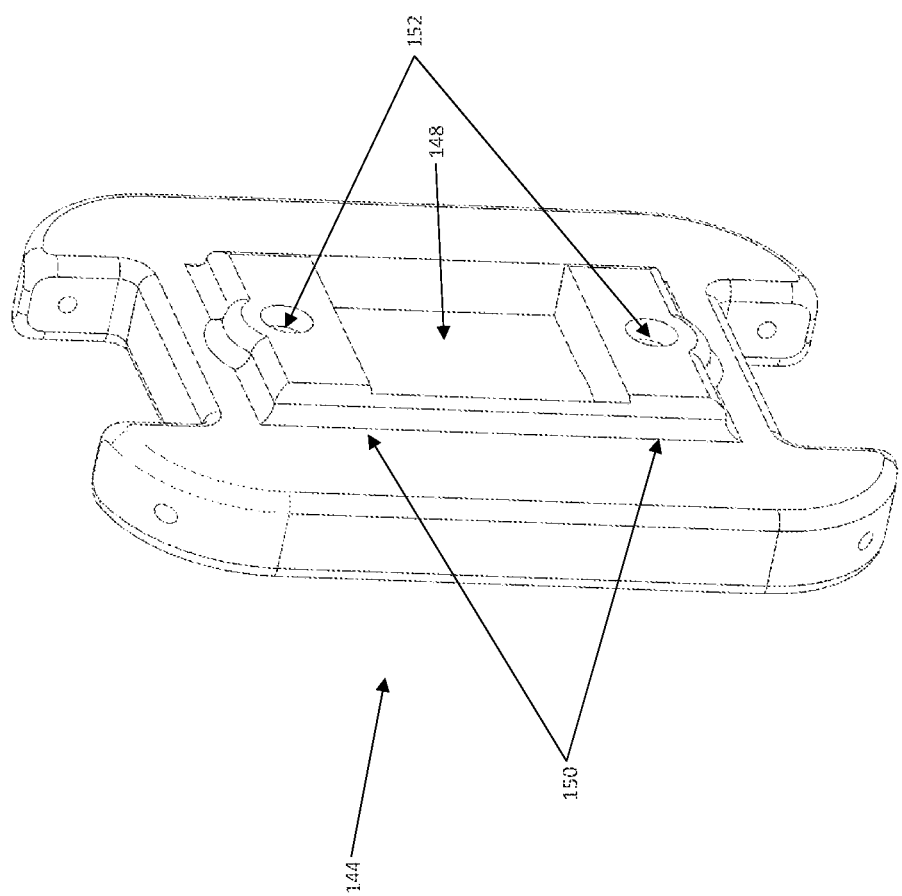
FIG. 4 illustrates a backside perspective view of an image recording device adapter of the NVGRA.

FIG. 4 illustrates a backside perspective view of the image recording device adapter 144. In FIG. 4, the backside of the image recording device adapter 144 has one or more surface features 150 such as ridges, walls, lips, etc., that mate with the second (recording) port 122 in the hollow body 106 of the NVGRA 100. One or more openings 152 may be formed in the image recording device adapter 144 and through which a fastener (not shown) such as a screw can be inserted and used to secure the image recording device adapter 144 to the hollow body 106 of the NVGRA 100. To accommodate a different type of image recording device 146, the image recording device adapter 144 is removed from the hollow body 106 of the NVGRA 100 and replaced with an adapter designed for that device.

Figure 5:
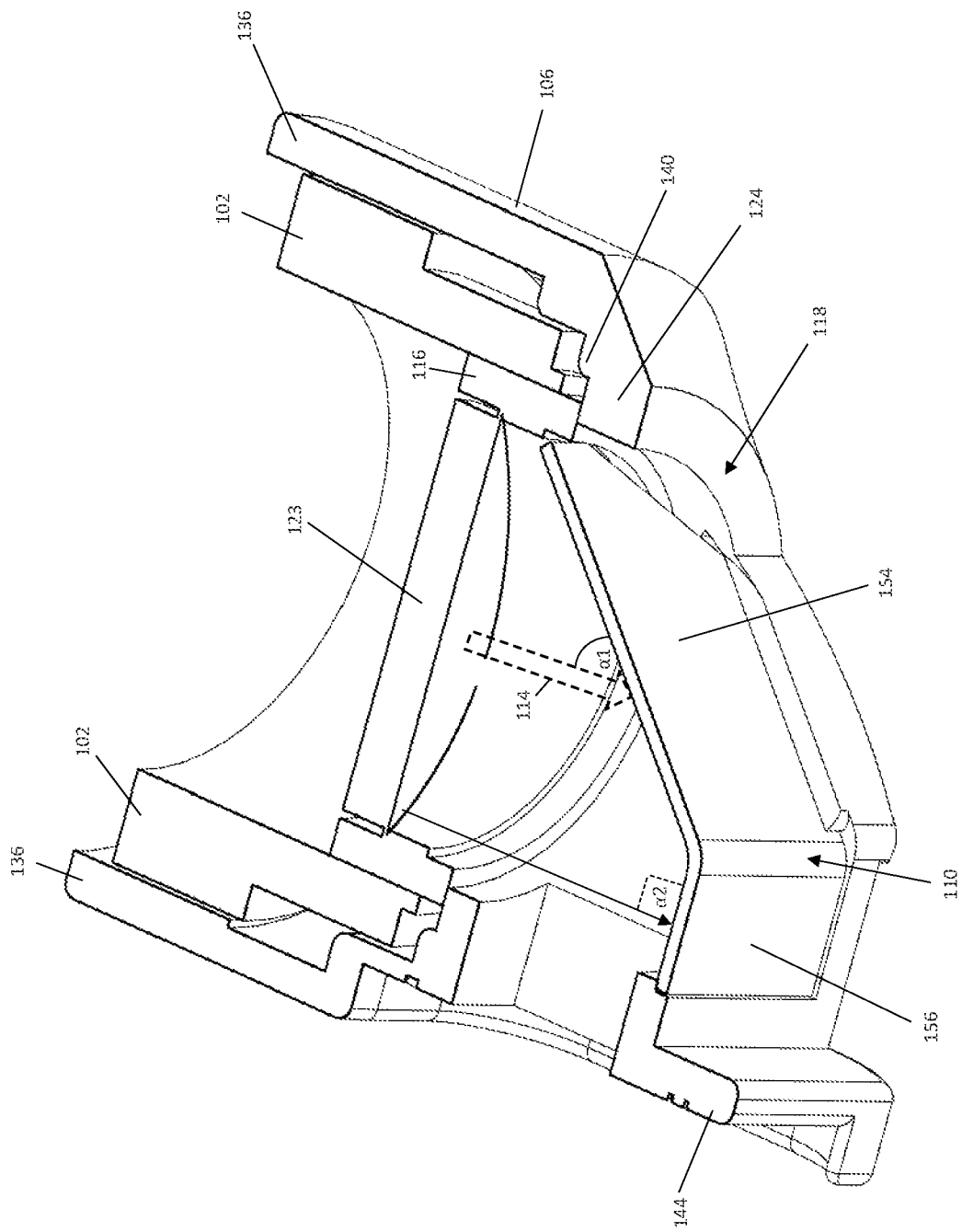
FIG. 5 illustrates a horizontal cross-sectional side perspective view of the NVGRA, according to another embodiment.

FIG. 5, which is a horizontal cross-sectional side perspective view of the NVGRA 100, illustrates the bent beam splitter feature described above. In FIG. 5, the beam splitter 110 includes a first part 154 and a second part 156. The first part 154 is angled with respect to the diopter lens assembly 116 such that the beam of light 114 that exits the diopter lens assembly 116 toward the first part 154 of the beam splitter 110 has an angle α1 of incidence less than 90 degrees. The second part 156 of the beam splitter 110 extends from the first part 154 and is oriented at a different angle α2 than the first part 154 of the beam splitter 110. The first and second parts 154, 156 of the beam splitter 110 collectively form a cover for the first (viewing) port 118 in the hollow body 106 of the NVGRA 100 such that the NVGRA 100 is devoid of a separate cover lens at the first (viewing) port 118 which saves about 3 mm, improving user comfort. In one embodiment, the beam splitter 110 is formed of a polycarbonate material to enable the bending illustrated in FIG. and 5 where the first and second parts 154, 156 of the beam splitter 110 are formed as a single, contiguous unit.

The image recording device adapter 144 is shown as an integral, contiguous part of the hollow body 106 of the NVGRA 100 in FIG. 5. According to this embodiment, the image recording device adapter 144 is not removeable. The image recording device adapter 144 instead may be implemented as shown in FIGS. 3 and 4, such that the image recording device adapter 144 is removeable.

Figure 7:
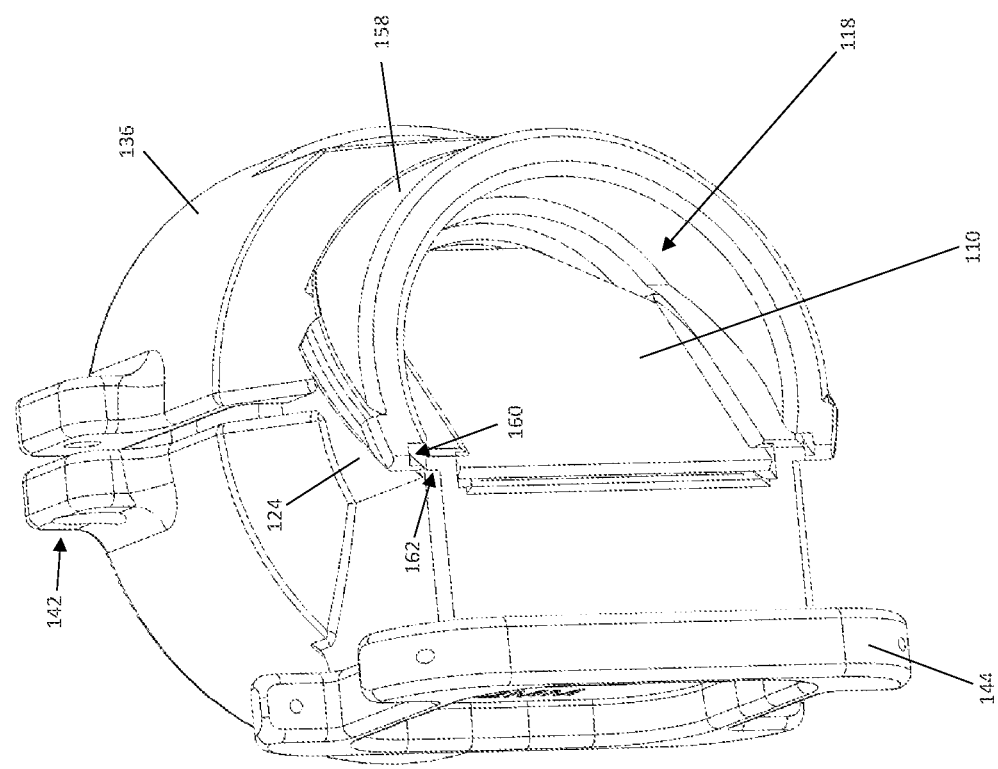
FIG. 6 illustrates a top perspective view of the NVGRA and FIG. 7 illustrates a partial side perspective view of the NVGRA, according to another embodiment.
Figure 6:
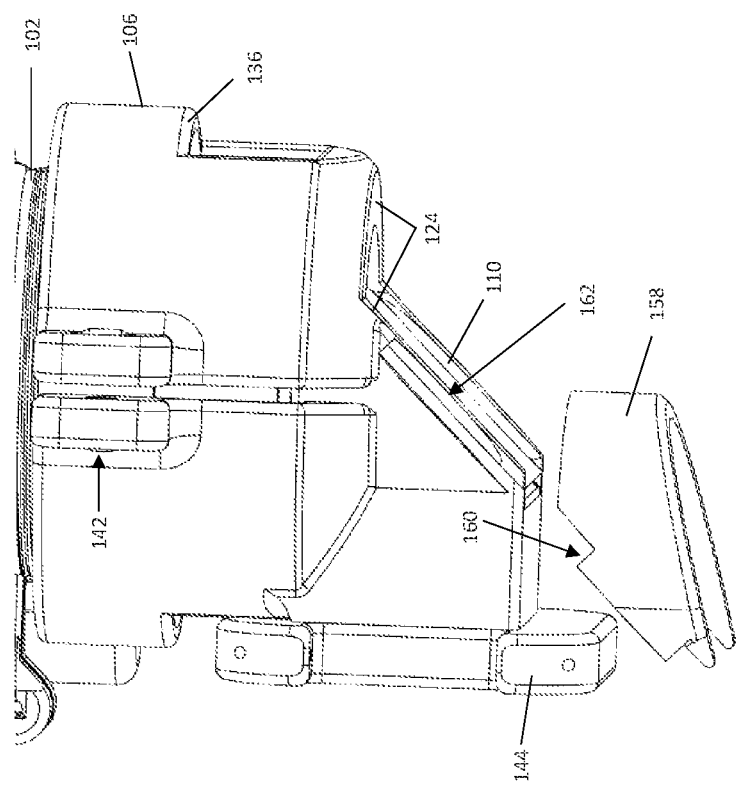

FIG. 6, which is a top perspective view of the NVGRA 100, and FIG. 7, which is a partial side perspective view of the NVGRA 100, illustrate the removeable eyecup feature described above. In FIGS. 6 and 7, the NVGRA 100 further includes a removeable eyecup 158 configured to slideably engage onto the first wall 124 of the hollow body 106 that delimits the first interior space 112 of the NVGRA 100. FIG. 6 shows the removeable eyecup 158 in a demounted state, whereas FIG. 7 shows the removeable eyecup 158 in a mounted state.

In one embodiment, the removeable eyecup 158 and the first wall 124 of the hollow body 106 that delimits the first interior space 112 of the NVGRA 100 are keyed in a complementary manner to yield mating surface structures 160, 162 that enable the removeable eyecup 158 to slideably engage the first wall 124 of the hollow body 106 that delimits the first interior space 112 of the NVGRA 100. For example, the mating surface structure 160 of the removeable eyecup 158 may include a slot or groove and the corresponding mating surface structure 162 of the first wall 124 of the hollow body 106 may include a ridge, tab, or other type of protrusion that is received by the slot/groove when the removeable eyecup 158 is slideably engaged onto the first wall 124 of the hollow body 106.

The removeable eyecup 158 may comprise a softer material such as a rubber material than the hollow body 106 of the NVGRA 100, such that the removeable eyecup 158 yields to physical pressure more readily than the hollow body 106 to enhance user comfort when the removeable eyecup 158 is mounted to the hollow body 106. The removeable eyecup 158 may break away when excessive force is applied, reducing user discomfort and preventing damage to the NVGRA 100. The removeable eyecup 158 allows the user to choose a balance between intimacy with his or her face via closer positioning, or superior image insulation from exterior white light. The removeable eyecup 158 may be adapted for operators wanting no light leakage from the NVGRA 100 to the surrounding environment.

Figure 8:
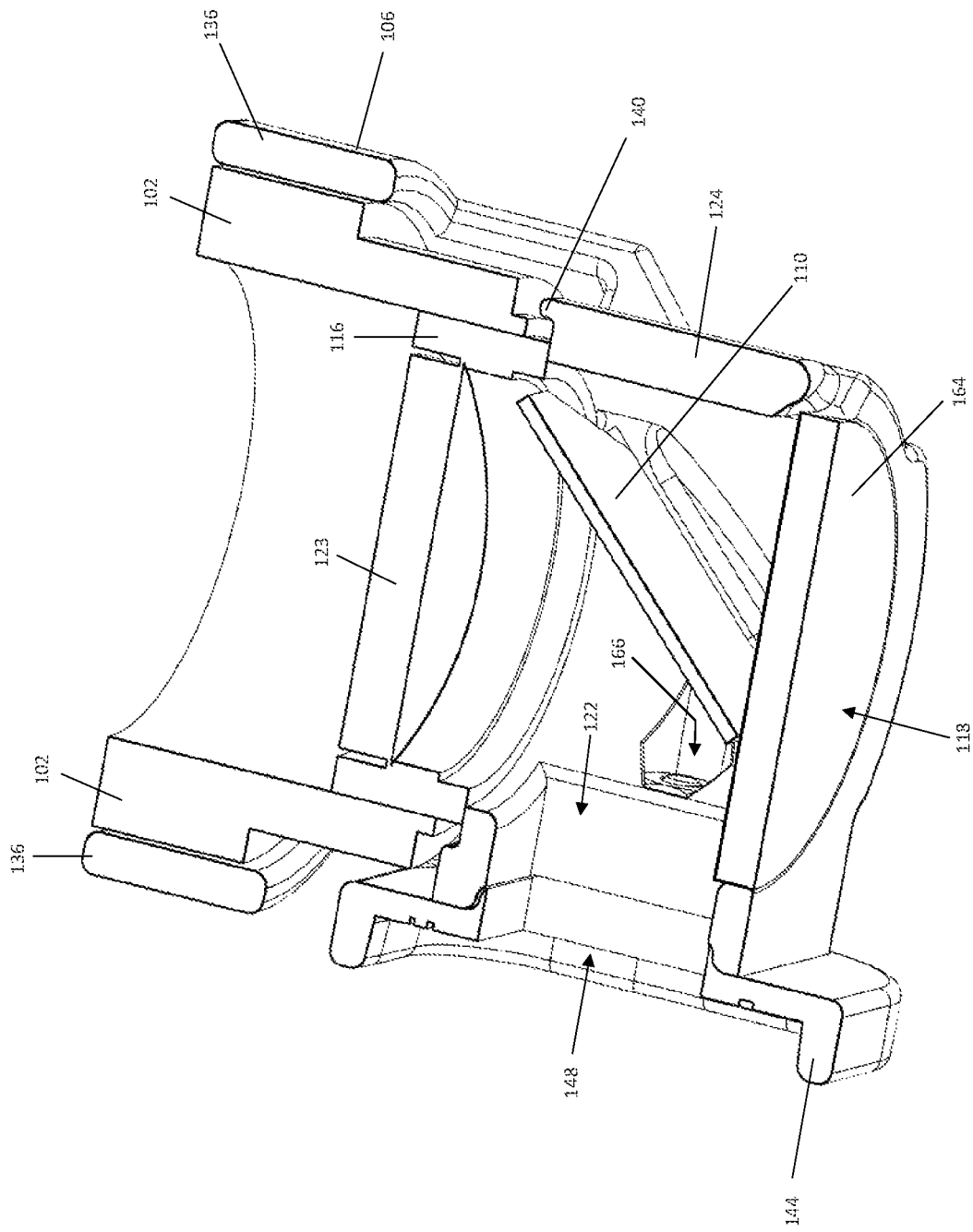
FIG. 8 illustrates a horizontal cross-sectional top perspective view of the NVGRA, according to another embodiment.

FIG. 8 illustrates a horizontal cross-sectional top perspective view of the NVGRA 100, according to another embodiment. In FIG. 8, the NVGRA 100 further includes an aperture stop and/or a corrective lens 164 placed in the viewing optical path. For example, the aperture stop and/or corrective lens 164 may be housed in the first (viewing) port 118 in the hollow body 106 of the NVGRA 100 as shown in FIG. 8.

Some image recording devices such as action cameras have a wide aperture lens (e.g., ~F2.5), resulting in a shallow depth of field. This can result in a slightly out of focus image when recording NVG footage, with or without the beam splitter 110 reflecting the image at 90 degrees. To correct for this, the aperture stop and/or corrective lens 164 can be inserted in the viewing optical path, e.g., seated in the first (viewing) port 118 in the hollow body 106 of the NVGRA 100. An aperture stop limits the amount of light reaching the first (viewing) port 118 in the hollow body 106, whereas a corrective lens has a corrective power that improves visual perception.

Figure 9:
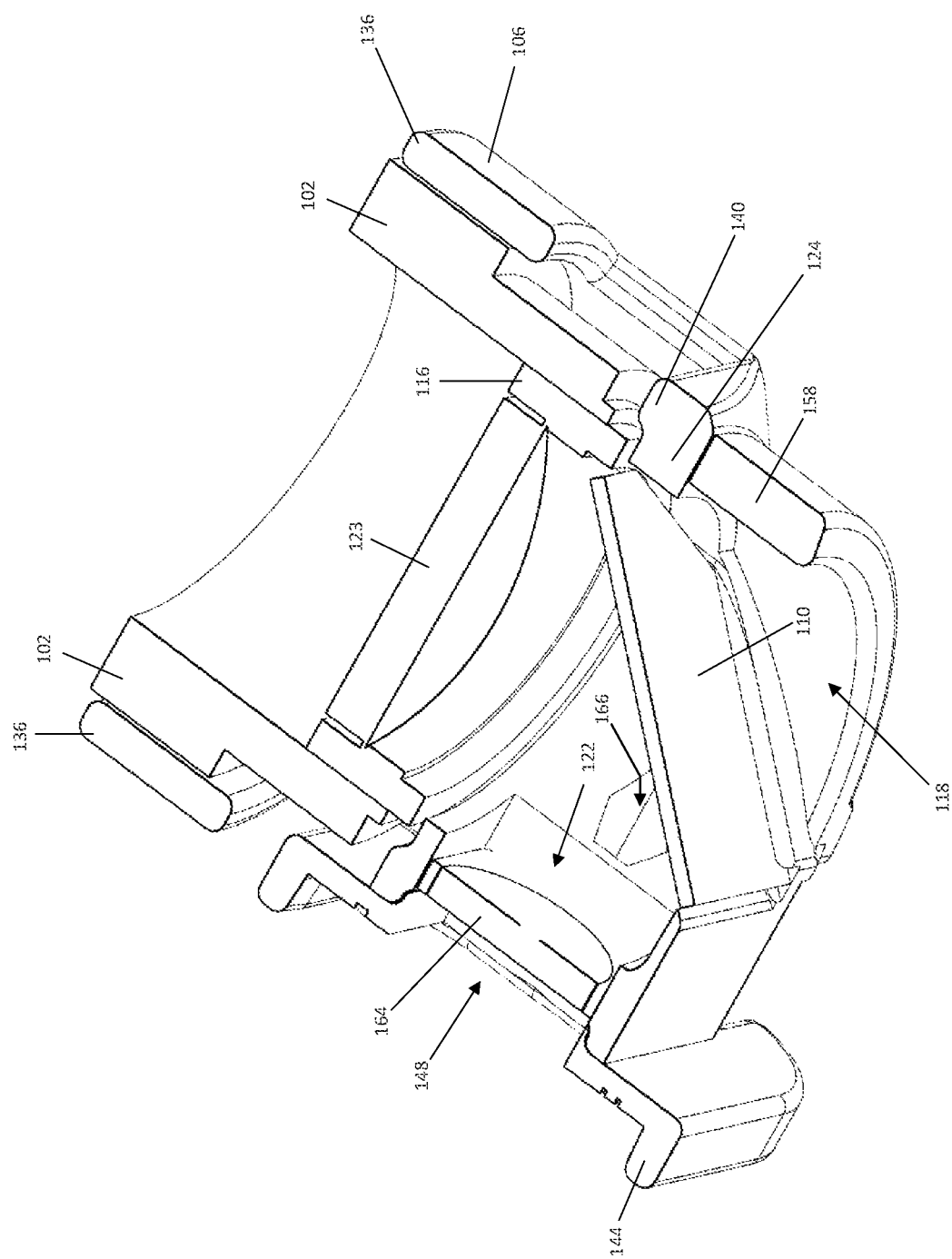
FIG. 9 illustrates a horizontal cross-sectional top perspective view of the NVGRA, according to another embodiment.

FIG. 9 illustrates a horizontal cross-sectional top perspective view of the NVGRA 100, according to another embodiment. In FIG. 9, the NVGRA 100 has the removeable eyecup 158 and the aperture stop and/or corrective lens 164 is placed in the recording optical path instead of the viewing optical path. For example, as shown in FIG. 9, the aperture stop and/or corrective lens 164 may be housed in the second (recording) port 122 in the hollow body 100 of the NVGRA 100. In another example, the aperture stop and/or corrective lens 164 may be housed in the recording port 148 in the image recording device adapter 144. In another embodiment, a first aperture stop and/or a first corrective lens 164 may be housed in the first (viewing) port 118 in the hollow body 106 of the NVGRA 100, e.g., as shown in FIG. 8, and a second aperture stop and/or a second corrective lens 164 may be housed in the second (recording) port 122 in the hollow body 100 of the NVGRA 100 or in the recording port 148 in the image recording device adapter 144, e.g., as shown in FIG. 9.

The image recording device adapter 144 and the hollow body 106 of the NVGRA 100 are shown as separate parts in FIGS. 8 and 9. According to these embodiments, the image recording device adapter 144 is removable and the first wall 124 of the hollow body 106 of the NVGRA 100 has one or more openings 166 for receiving a fastener used to secure the removeable image recording device adapter 144 to the NVGRA 100. The image recording device adapter 144 instead may be an integral, contiguous part of the hollow body 106 of the NVGRA 100, e.g., as shown in FIG. 5 and therefore not removeable.

Although the present disclosure is not so limited, the following numbered examples demonstrate one or more aspects of the disclosure.

Example 1. A night vision goggle recording adapter, comprising: a hollow body configured to receive a distal end of a diopter housing of a night vision goggle; and a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body, wherein a diameter of the first interior space is smaller than an outer diameter of the diopter lens assembly, such that a first wall of the hollow body that delimits the first interior space has an end face configured to abut a front face of the diopter lens assembly for all zero and positive diopter settings of the diopter lens assembly.

Example 2. The night vision goggle recording adapter of example 1, wherein the beam splitter extends into the diopter lens assembly when the first wall of the hollow body that delimits the first interior space abuts the front face of the diopter lens assembly.

Example 3. The night vision goggle recording adapter of example 1 or 2, wherein the beam splitter comprises a first part and a second part, wherein the first part is angled with respect to the diopter lens assembly such that the beam of light that exits the diopter lens assembly toward the first part of the beam splitter has an angle of incidence less than 90 degrees, wherein the second part extends from the first part and is oriented at a different angle than the first part, and wherein the first part and the second part of the beam splitter collectively form a cover for the first port in the hollow body such that the night vision goggle recording adapter is devoid of a separate cover lens at the first port.

Example 4. The night vision goggle recording adapter of example 3, wherein the beam splitter is formed of a polycarbonate material.

Example 5. The night vision goggle recording adapter of any of examples 1 through 4, further comprising: a removeable eyecup slideably engaged onto the first wall of the hollow body that delimits the first interior space.

Example 6. The night vision goggle recording adapter of example 5, wherein the removeable eyecup and the first wall of the hollow body that delimits the first interior space are keyed in a complementary manner that enables the removeable eyecup to slideably engage the first wall of the hollow body that delimits the first interior space.

Example 7. The night vision goggle recording adapter of example 5 or 6, wherein the removeable eyecup comprises a softer material than the hollow body such that the removeable eyecup yields to physical pressure more readily than the hollow body.

Example 8. The night vision goggle recording adapter of any of examples 1 through 7, further comprising: an image recording device adapter mounted in a removeable manner to the hollow body and aligned with the second port in the hollow body, wherein the image recording device adapter is configured to receive an image recording device and pass the beam reflected by the beam splitter through the second port to the image recording device.

Example 9. The night vision goggle recording adapter of example 8, further comprising: an aperture stop and/or a corrective lens housed in the image recording device adapter.

Example 10. The night vision goggle recording adapter of any of examples 1 through 8, further comprising: an aperture stop and/or a corrective lens housed in the first port.

Example 11. The night vision goggle recording adapter of any of examples 1 through 10, wherein the hollow body further comprises a second wall that delimits a second interior space configured to receive the distal end of the diopter housing, wherein the first interior space is openly connected to the second interior space, and wherein the first wall and the second wall are connected to one another by a transition region of the hollow body that accommodates an outer diameter difference between the diopter housing and the diopter lens assembly of the night vision goggle.

Example 12. A night vision goggle recording adapter, comprising: a hollow body configured to receive a distal end of a diopter housing of a night vision goggle; a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and an image recording device adapter mounted in a removeable manner to the hollow body and aligned with the second port in the hollow body, wherein the image recording device adapter is configured to receive an image recording device and pass the beam reflected by the beam splitter through the second port to the image recording device.

Example 13. The night vision goggle recording adapter of example 12, further comprising: an aperture stop and/or a corrective lens housed in the image recording device adapter.

Example 14. The night vision goggle recording adapter of example 12 or 13, wherein the beam splitter comprises a first part and a second part, wherein the first part is angled with respect to the diopter lens assembly such that the beam of light that exits the diopter lens assembly toward the first part of the beam splitter has an angle of incidence less than 90 degrees, wherein the second part extends from the first part and is oriented at a different angle than the first part, and wherein the first part and the second part of the beam splitter collectively form a cover for the first port in the hollow body such that the night vision goggle recording adapter is devoid of a separate cover lens at the first port.

Example 15. The night vision goggle recording adapter of example 14, wherein the beam splitter is formed of a polycarbonate material.

Example 16. A night vision goggle recording adapter, comprising: a hollow body configured to receive a distal end of a diopter housing of a night vision goggle; a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and a removeable eyecup slideably engaged onto the first wall of the hollow body that delimits the first interior space.

Example 17. The night vision goggle recording adapter of example 16, wherein the removeable eyecup and the first wall of the hollow body that delimits the first interior space are keyed in a complementary manner that enables the removeable eyecup to slideably engage the first wall of the hollow body.

Example 18. The night vision goggle recording adapter of example 16 or 17, wherein the removeable eyecup comprises a softer material than the hollow body such that the removeable eyecup yields to physical pressure more readily than the hollow body.

Example 19. The night vision goggle recording adapter of any of examples 16 through 18, further comprising: an aperture stop and/or a corrective lens housed in the first port.

Example 20. The night vision goggle recording adapter of any of examples 16 through 19, further comprising: an image recording device adapter mounted in a removeable manner to the hollow body and aligned with the second port in the hollow body, wherein the image recording device adapter is configured to receive an image recording device and pass the beam reflected by the beam splitter through the second port to the image recording device.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein can be combined with each other, unless specifically noted otherwise.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A night vision goggle recording adapter, comprising:
    a hollow body configured to receive a distal end of a diopter housing of a night vision goggle; and
    a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body,
    wherein a diameter of the first interior space is smaller than an outer diameter of the diopter lens assembly, such that a first wall of the hollow body that delimits the first interior space has an end face configured to abut a front face of the diopter lens assembly for all zero and positive diopter settings of the diopter lens assembly.

2. The night vision goggle recording adapter of claim 1, wherein the beam splitter extends into the diopter lens assembly when the first wall of the hollow body that delimits the first interior space abuts the front face of the diopter lens assembly.

3. The night vision goggle recording adapter of claim 1, wherein the beam splitter comprises a first part and a second part, wherein the first part is angled with respect to the diopter lens assembly such that the beam of light that exits the diopter lens assembly toward the first part of the beam splitter has an angle of incidence less than 90 degrees, wherein the second part extends from the first part and is oriented at a different angle than the first part, and wherein the first part and the second part of the beam splitter collectively form a cover for the first port in the hollow body such that the night vision goggle recording adapter is devoid of a separate cover lens at the first port.

4. The night vision goggle recording adapter of claim 3, wherein the beam splitter is formed of a polycarbonate material.

5. The night vision goggle recording adapter of claim 1, further comprising:
    a removeable eyecup slideably engaged onto the first wall of the hollow body that delimits the first interior space.

6. The night vision goggle recording adapter of claim 5, wherein the removeable eyecup and the first wall of the hollow body that delimits the first interior space are keyed in a complementary manner that enables the removeable eyecup to slideably engage the first wall of the hollow body that delimits the first interior space.

7. The night vision goggle recording adapter of claim 5, wherein the removeable eyecup comprises a softer material than the hollow body such that the removeable eyecup yields to physical pressure more readily than the hollow body.

8. The night vision goggle recording adapter of claim 1, further comprising:
    an image recording device adapter mounted in a removeable manner to the hollow body and aligned with the second port in the hollow body,
    wherein the image recording device adapter is configured to receive an image recording device and pass the beam reflected by the beam splitter through the second port to the image recording device.

9. The night vision goggle recording adapter of claim 8, further comprising:
an aperture stop and/or a corrective lens housed in the image recording device adapter.

10. The night vision goggle recording adapter of claim 1, further comprising:
an aperture stop and/or a corrective lens housed in the first port.

11. The night vision goggle recording adapter of claim 1, wherein the hollow body further comprises a second wall that delimits a second interior space configured to receive the distal end of the diopter housing, wherein the first interior space is openly connected to the second interior space, and wherein the first wall and the second wall are connected to one another by a transition region of the hollow body that accommodates an outer diameter difference between the diopter housing and the diopter lens assembly of the night vision goggle.

12. A night vision goggle recording adapter, comprising:
a hollow body configured to receive a distal end of a diopter housing of a night vision goggle;
a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and
an image recording device adapter mounted in a removeable manner to the hollow body and aligned with the second port in the hollow body,
wherein the image recording device adapter is configured to receive an image recording device and pass the beam reflected by the beam splitter through the second port to the image recording device.

13. The night vision goggle recording adapter of claim 12, further comprising:
an aperture stop and/or a corrective lens housed in the image recording device adapter.

14. The night vision goggle recording adapter of claim 12, wherein the beam splitter comprises a first part and a second part, wherein the first part is angled with respect to the diopter lens assembly such that the beam of light that exits the diopter lens assembly toward the first part of the beam splitter has an angle of incidence less than 90 degrees, wherein the second part extends from the first part and is oriented at a different angle than the first part, and wherein the first part and the second part of the beam splitter collectively form a cover for the first port in the hollow body such that the night vision goggle recording adapter is devoid of a separate cover lens at the first port.

15. The night vision goggle recording adapter of claim 14, wherein the beam splitter is formed of a polycarbonate material.

16. A night vision goggle recording adapter, comprising:
a hollow body configured to receive a distal end of a diopter housing of a night vision goggle;
a beam splitter disposed in a first interior space delimited by the hollow body, the beam splitter configured to split a beam of light that exits a diopter lens assembly disposed in the diopter housing into a transmitted beam that exits the night vision goggle recording adapter through a first port in the hollow body and a reflected beam that exits the night vision goggle recording adapter through a second port in the hollow body; and
a removeable eyecup slideably engaged onto a first wall of the hollow body that delimits the first interior space.

17. The night vision goggle recording adapter of claim 16, wherein the removeable eyecup and the first wall of the hollow body that delimits the first interior space are keyed in a complementary manner that enables the removeable eyecup to slideably engage the first wall of the hollow body.

18. The night vision goggle recording adapter of claim 16, wherein the removeable eyecup comprises a softer material than the hollow body such that the removeable eyecup yields to physical pressure more readily than the hollow body.

19. The night vision goggle recording adapter of claim 16, further comprising:
an aperture stop and/or a corrective lens housed in the first port.

20. The night vision goggle recording adapter of claim 16, further comprising:
an image recording device adapter mounted in a removeable manner to the hollow body and aligned with the second port in the hollow body,
wherein the image recording device adapter is configured to receive an image recording device and pass the beam reflected by the beam splitter through the second port to the image recording device.

* * * * *